United States Patent
Harada et al.

(10) Patent No.: US 10,389,564 B2
(45) Date of Patent: Aug. 20, 2019

(54) RADIO BASE STATION, USER TERMINAL AND RADIO COMMUNICATION METHOD

(71) Applicant: NTT DOCOMO, INC., Tokyo (JP)

(72) Inventors: Hiroki Harada, Tokyo (JP); Yongbo Zeng, Beijing (CN); Qun Zhao, Beijing (CN); Yongsheng Zhang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 129 days.

(21) Appl. No.: 15/032,343

(22) PCT Filed: Oct. 16, 2014

(86) PCT No.: PCT/JP2014/077488
§ 371 (c)(1),
(2) Date: Apr. 27, 2016

(87) PCT Pub. No.: WO2015/064366
PCT Pub. Date: May 7, 2015

(65) Prior Publication Data
US 2016/0294595 A1    Oct. 6, 2016

(30) Foreign Application Priority Data
Oct. 31, 2013   (JP) .................................. 2013-226439

(51) Int. Cl.
*H04L 27/26*   (2006.01)
*H04W 8/00*   (2009.01)
*H04W 72/04*   (2009.01)

(52) U.S. Cl.
CPC ...... *H04L 27/2607* (2013.01); *H04L 27/2646* (2013.01); *H04W 8/005* (2013.01); *H04W 72/0446* (2013.01)

(58) Field of Classification Search
CPC .......... H04L 27/2607; H04L 27/2646; H04W 8/005; H04W 72/0446
See application file for complete search history.

(56) References Cited

U.S. PATENT DOCUMENTS

| | | | | |
|---|---|---|---|---|
| 2004/0213145 | A1* | 10/2004 | Nakamura | H04L 5/0016 370/208 |
| 2009/0116421 | A1* | 5/2009 | Kawasaki | H04L 5/0053 370/312 |
| 2012/0263108 | A1* | 10/2012 | Ban | H04W 8/26 370/328 |
| 2013/0028346 | A1* | 1/2013 | Hottinen | H04W 16/14 375/285 |
| 2013/0273924 | A1* | 10/2013 | Hakola | H04W 72/0413 455/450 |
| 2014/0044108 | A1* | 2/2014 | Earnshaw et al. | H04W 56/001 370/336 |

(Continued)

FOREIGN PATENT DOCUMENTS

WO      2014/058221 A2      4/2014

OTHER PUBLICATIONS

Extended European Search Report issued in corresponding European Application No. 14858355.2, dated Jun. 21, 2017 (9 pages).

(Continued)

*Primary Examiner* — Ivan O Latorre
(74) *Attorney, Agent, or Firm* — Osha Liang LLP

(57) ABSTRACT

The present invention is designed so that, in a radio communication system in which inter-terminal communication is carried out, the impact of inter-symbol interference due to the delay of inter-terminal discovery signals is reduced. The radio communication method of the present invention is used in a radio communication system in which each user terminal transmits the inter-terminal discovery signal in a transmission duration of a predetermined period. A radio base station determines the cyclic prefix (CP) length configuration for use in the transmission duration, and transmits cyclic prefix (CP) length configuration information which represents the CP length configuration. Each user terminal transmits the inter-terminal discovery signal based on the CP length configuration information.

11 Claims, 11 Drawing Sheets

(56) References Cited

U.S. PATENT DOCUMENTS

| | | | | |
|---|---|---|---|---|
| 2014/0064263 A1* | 3/2014 | Cheng | ................... | H04W 8/005 370/350 |
| 2015/0131749 A1* | 5/2015 | Slomina | ................ | H04J 11/005 375/260 |
| 2015/0215979 A1* | 7/2015 | Nan | .................... | H04L 27/0006 370/329 |
| 2015/0264551 A1* | 9/2015 | Ko | ........................ | H04W 8/005 370/329 |
| 2015/0282132 A1* | 10/2015 | Kim | ..................... | H04W 8/005 370/329 |
| 2015/0358801 A1* | 12/2015 | Seo | ...................... | H04W 8/005 370/329 |
| 2016/0014589 A1* | 1/2016 | Niu | ................... | H04W 72/0413 370/329 |
| 2016/0142898 A1* | 5/2016 | Poitau | ................... | H04W 76/14 370/329 |
| 2017/0134926 A1* | 5/2017 | Johnsson | .............. | H04W 8/005 |

OTHER PUBLICATIONS

International Search Report issued in PCT/JP2014/077488 dated Jan. 13, 2015 (2 pages).

Written Opinion of the International Searching Authority issued in PCT/JP2014/077488 dated Jan. 13, 2015 (3 pages).

NTT DOCOMO, Inc.; "Views on D2D discovery resource allocation"; 3GPP TSG RAN WG1 Meeting #75, R1-135522; San, Francisco, USA; Nov. 11-15, 2013 (4 pages).

Huawei et al.; "WF on D2D CP length configuration"; 3GPP TSG RAN WG1 Meeting #76b, R1-141573; Shenzhen, China; Mar. 31-Apr. 4, 2014 (2 pages).

3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (107 pages).

\* cited by examiner

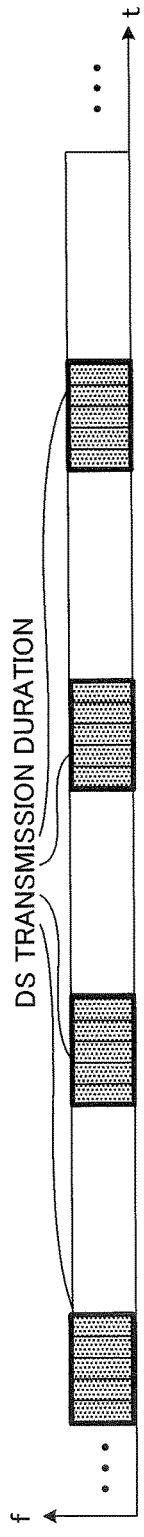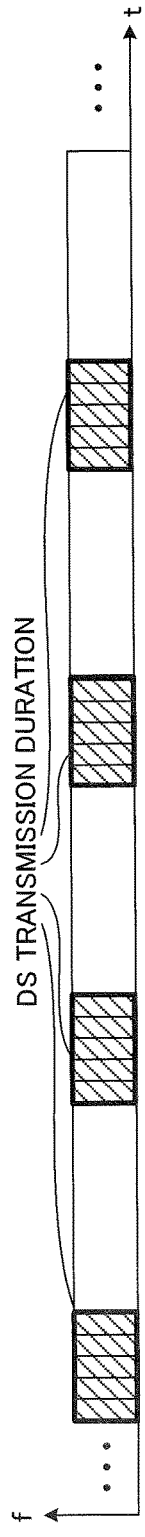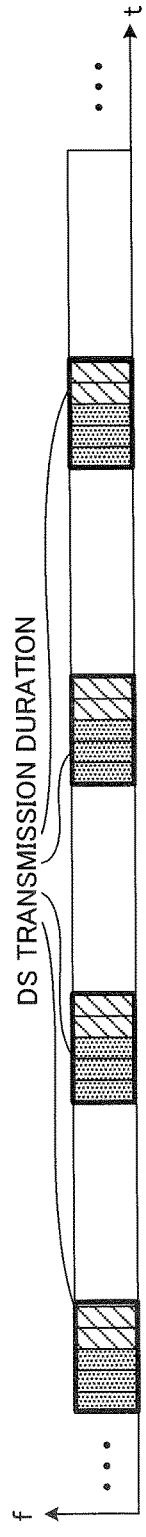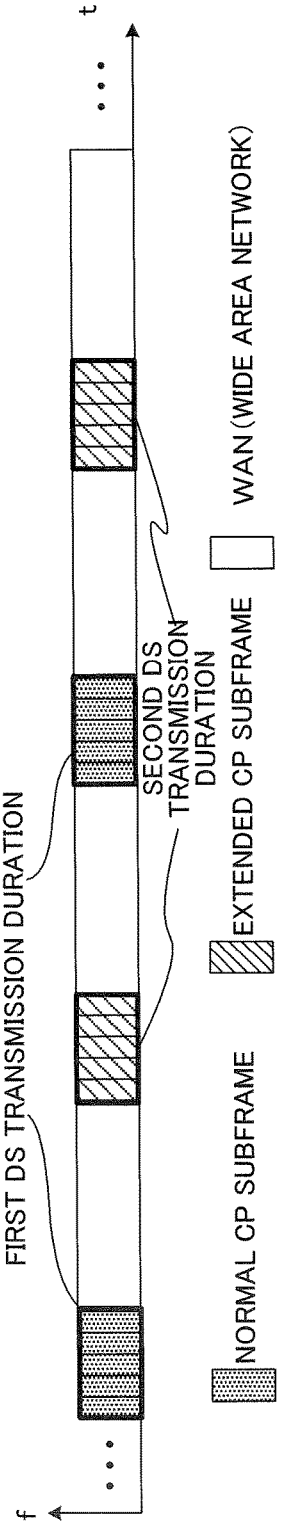

THREE BITS INDICATOR

| B0~B2 |
|---|
| PATTERN |

B0B1B2=000: CP LENGTH CONFIGURATION 1
B0B1B2=001: CP LENGTH CONFIGURATION 2
B0B1B2=010-111: CP LENGTH CONFIGURATION 3
(INCLUDING CP LENGTH CONFIGURATIONS 3-1 and 3-2)

FIG.5A

FOUR BITS INDICATOR

| B0~B1 | B2~B3 |
|---|---|
| CONFIGURATION TYPE | SIZE CONFIGURATION |

B0B1=00: CP LENGTH CONFIGURATION 1
B0B1=01: CP LENGTH CONFIGURATION 2
B0B1=10: CP LENGTH CONFIGURATION 3-1
B0B1=11: CP LENGTH CONFIGURATION 3-2

SIZE CONFIGURATION IS PROVIDED OR MADE VALID ONLY WHEN B0=1

RADIO BASE STATION, USER TERMINAL AND RADIO COMMUNICATION METHOD

TECHNICAL FIELD

The present invention relates to a radio base station, a user terminal and a radio communication method in a next-generation mobile communication system in which inter-terminal communication is carried out.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1).

In this LTE and successor systems of LTE (referred to as, for example, "LTE-advanced," "FRA (Future Radio Access)," "4G," etc.), a radio communication system to support inter-terminal communication (D2D: Device-to-Device) is under study. In inter-terminal communication, a user terminal discovers other user terminals (discovery) without involving radio base stations, and communicates with these other user terminals.

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

In a radio communication system in which inter-terminal communication is carried out, a study is in progress to execute inter-terminal discovery (D2D discovery), in which each user terminal discovers other user terminals, without involving a radio base station (directly), by transmitting an inter-terminal discovery signal (discovery signal) in one ore more transmission durations of a predetermined period.

In this inter-terminal discovery, there is a threat that the arrival timing of inter-terminal discovery signals is delayed due to propagation delays, timing errors and so on, and inter-symbol interference is produced.

The present invention has been made in view of the above, and it is therefore an object of the present invention to provide a radio base station, a user terminal and a radio communication method which can reduce the impact of inter-symbol interference due to the delay of inter-terminal discovery signals, in a radio communication system in which inter-terminal communication is carried out.

Solution to Problem

The radio communication method according to the present invention provides a radio communication method for use in a radio communication system, in which each user terminal transmits an inter-terminal discovery signal in a transmission duration of a predetermined period, and this radio communication method includes the steps of: in a radio base station, determining a cyclic prefix (CP) length configuration for use in the transmission duration, and transmitting cyclic prefix (CP) length configuration information which represents the CP length configuration; and in each user terminal, transmitting the inter-terminal discovery signal based on the CP length configuration information.

Advantageous Effects of Invention

According to the present invention, it is possible to reduce the impact of inter-symbol interference due to the delay of inter-terminal discovery signals in a radio communication system in which inter-terminal communication is carried out.

BRIEF DESCRIPTION OF DRAWINGS

FIG. 4 provides diagrams to explain the CP length configurations for use in the radio communication method according to the present invention;

FIG. 5 provides diagrams to explain CP the length configuration information for use in the radio communication method according to the present invention;

DESCRIPTION OF EMBODIMENTS

Figure 1A:
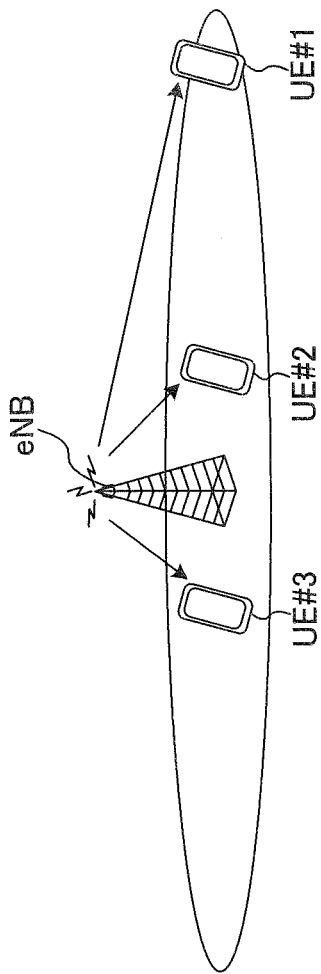
FIG. 1 provides diagrams to show an example of a radio communication system in which inter-terminal communication is carried out.

FIG. 1 is a diagram to show an example of a radio communication system in which inter-terminal communication (D2D communication) is carried out. As shown in FIG. 1A, the radio communication system is formed by including a radio base station (eNB: eNodeB) and user terminals (UE: User Equipment) #1 to #3 in the cell formed by the radio base station. Note that, in FIG. 1A, a plurality of radio base stations may be provided, and the number of user terminals is not limited to 3 either.

In the radio communication system shown in FIG. 1A, the radio base station reports information that represents DS transmission durations (for example, subframe offset, the period of these DS transmission durations, the number of subframes in these DS transmission durations, and so on) to user terminals #1 to #3. Note that this reporting may be carried out by using, for example, SIB (System Information Block) signaling, RRC (Radio Resource Control) signaling, a broadcast channel (PBCH: Physical Broadcast Channel) and so on.

Figure 1B:
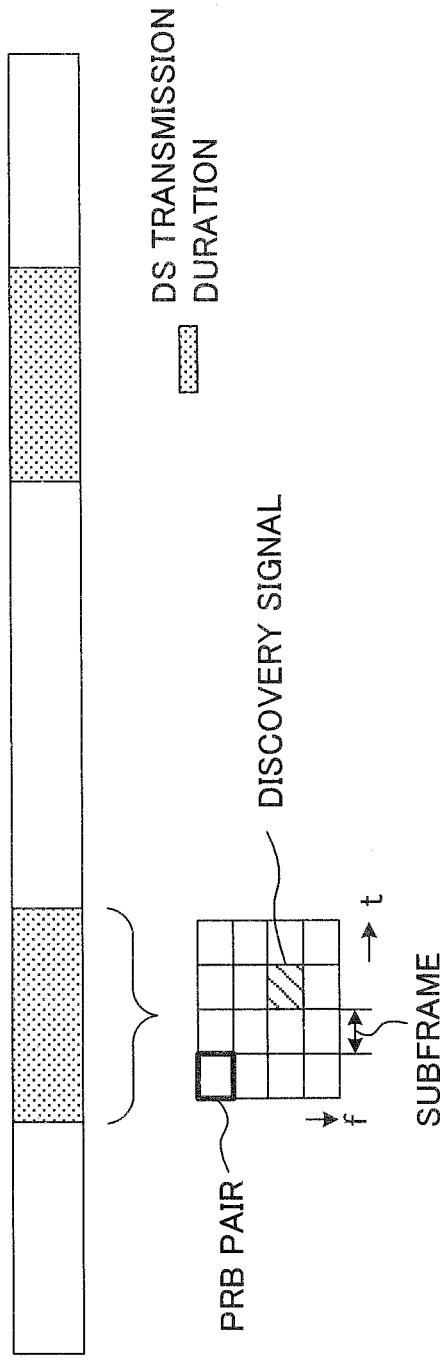

The DS transmission durations here refer to the transmission durations of discovery signals, provided in a predetermined period. For example, as shown in FIG. 1B, a DS transmission duration (uplink resource allocation for D2D discovery, D2D discovery resource, etc.), which is arranged in a predetermined period as an uplink resource, is comprised of, for example, a plurality of subframes.

Also, the discovery signals here refer to inter-terminal discovery signals for allowing user terminals #1 to #3 to discover one another. A discovery signal is formed with, for example, 104 bits, and allocated to a predetermined resource unit (for example, at least one PRB (Physical Resource Block) pair) that is provided by dividing a DS transmission duration in frequency division (FDM) and/or time division (TDM).

Each user terminal transmits the discovery signal in one or more resource units (for example, at least one PRB pair) in DS transmission durations reported from the radio base station. Note that these resource units may be resource units that are randomly selected in DS transmission durations (type-1, collision-type, etc.), or may be resource units that are specified by the radio base station on a per user terminal basis (type-2, non-collision type, etc.).

Each user terminal detects the discovery signals transmitted from other user terminals in DS transmission durations, and discovers (identifies) other user terminals. Note that, in uplink resources apart from the DS transmission durations, each user terminal performs uplink communication with the radio base station.

Figure 2:
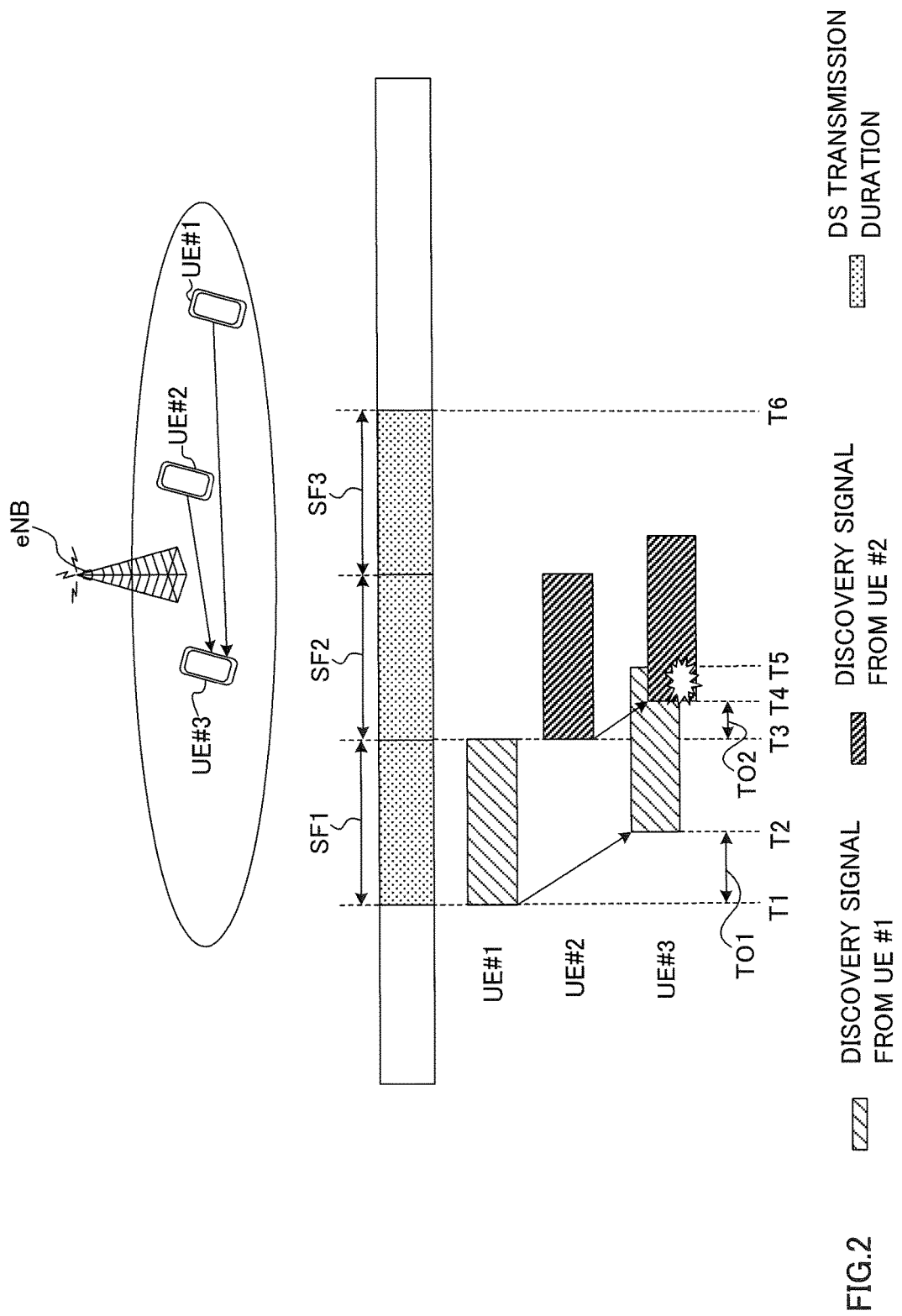
FIG. 2 is a diagram to show an example of inter-terminal discovery.

Inter-terminal discovery (D2D discovery) in DS transmission durations will be described in detail with reference to FIG. 2. FIG. 2 is a diagram to show an example of inter-terminal discovery. Assume that, in FIG. 2, the start timing (timing T1), the length of time (the length of time from the timing T1 to T6) and the period of the DS transmission duration are reported from the radio base station to user terminals #1 to #3. Also, although the DS transmission duration in FIG. 2 is formed with three subframes, this is by no means limiting.

For example, a case will be considered here where, as shown in FIG. 2, a user terminal #1 transmits the discovery signal in a subframe (SF) 1, and a user terminal #2 transmits the discovery signal in a subframe (SF) 2. In this case, the discovery signal from user terminal #1 arrives at user terminal #3 at a timing T2, which is a certain amount of time late to the start timing T1 of subframe 1, due to the propagation delay and timing error between user terminals #1 and #3.

In this way, a time gap (timing offset (TO1)) is produced between the start timing T1 of the subframe 1 and the arrival timing T2 of the discovery signal from user terminal #1 in user terminal #3. Due to this TO1, the discovery signal from user terminal #1 partly overlaps the subframe 2 and is received in user terminal #3.

Similarly, a time gap (timing offset (TO2)) is produced between the start timing T3 of the subframe 2 and the arrival timing T4 of the discovery signal from user terminal #2 in user terminal #3. Here, the distance between user terminals #2 and #3 is shorter than the distance between user terminals #1 and #3, so that TO2 is shorter than TO1. Consequently, if user terminal #3 tries to receive the discovery signal from user terminal #2 at a timing T4, user terminal #3 suffers interference (inter-symbol interference) from the discovery signal of user terminal #1, between the timings T4 and T5.

As a method of reducing such timing offsets, it may be possible to use the timing advance (TA) that is reported from the radio base station. The TA specifies how far in time the transmission timing of an uplink signal is to be brought backward so that the uplink signal will arrive at a desired timing.

However, the TA is reported from the radio base station to user terminals in connected mode, but is not reported to user terminals in idle mode. Consequently, there is a threat that user terminals #1 and #2 cannot avoid the above-described TO1 and TO2 while in idle mode. Also, since the TA is a correctional value based on the propagation delay between the radio base station and the user terminals, there is a threat that TO1 and TO2, which are produced due to propagation delays between the user terminals, cannot be avoided sufficiently.

Now, DS transmission durations are formed with, for example, a plurality of subframes, and each subframe is formed with a plurality of OFDM symbols that include cyclic prefixes (CPs) (also referred to as "guard intervals"). A cyclic prefix is a redundant signal, and, to be more specific, a certain portion of time copied from the second half of an OFDM symbol and stuck to the top of the OFDM symbol.

For example, referring to FIG. 2, user terminal #3 cuts off the signal of the length of the CP length from the arrival timing T4, as the top OFDM symbol of the discovery signal from user terminal #2, and detects the part that is left. Consequently, in FIG. 2, if the time the discovery signal from user terminal #1 and the discovery signal from user terminal #2 overlap (that is, the length of time between the timings T4 and T5) is shorter than the CP length, the above-mentioned inter-symbol interference can be canceled.

Figure 3:
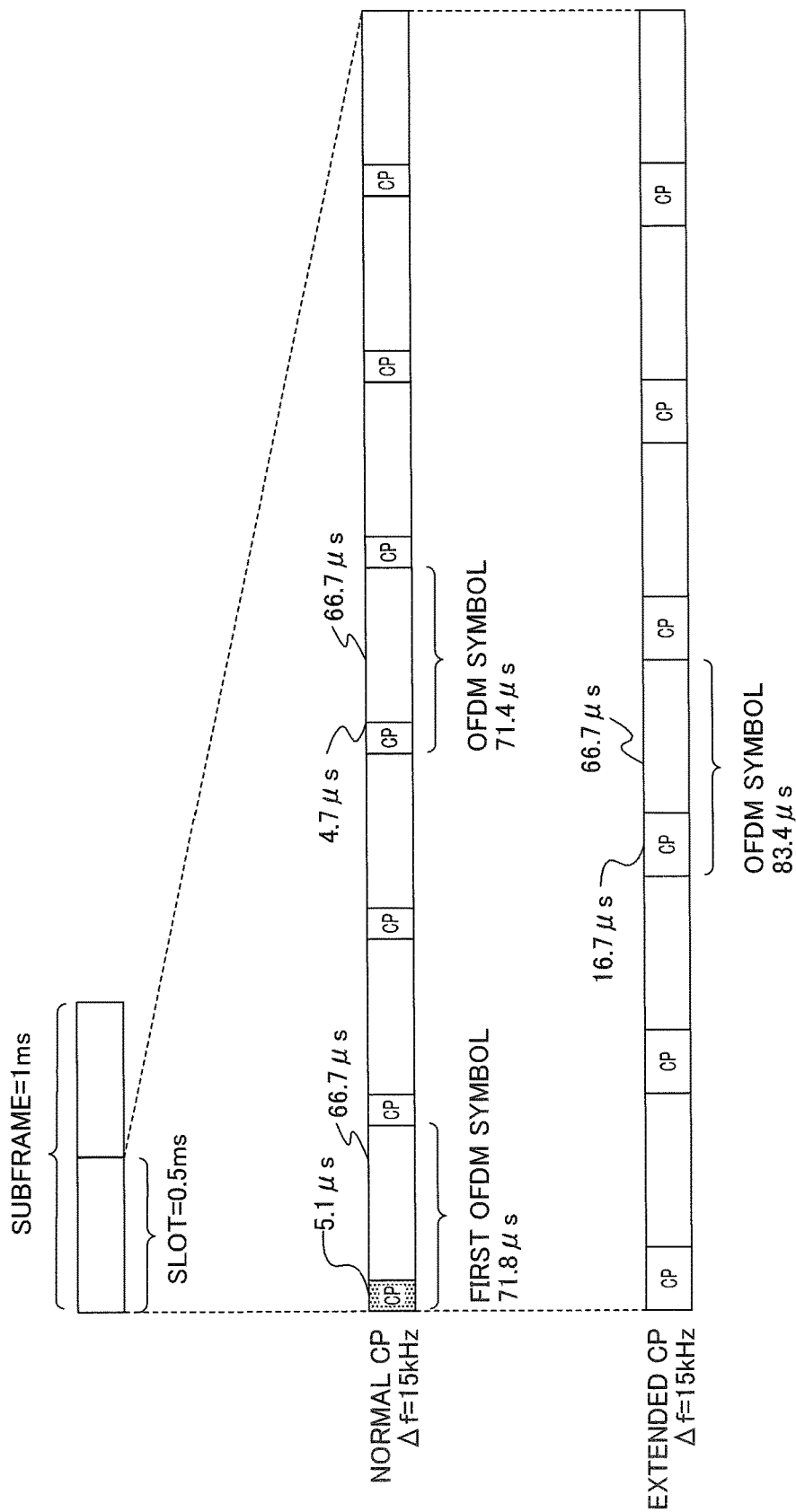
FIG. 3 is a diagram to show normal CPs and extended CPs.

Cyclic prefixes (CPs) will be described in detail with reference to FIG. 3. FIG. 3 is a diagram to explain normal CPs and extended CPs. As shown in FIG. 3, one subframe is formed with two slots, one subframe is one ms, and one slot is 0.5 ms. Each slot is formed with a plurality of OFDM symbols, and a CP is attached to the top of each OFDM symbol. Note that the CP lengths, the OFDM symbol lengths and the numbers of OFDM symbols shown in FIG. 3 are simply examples, and these are by no means limiting.

With normal CPs, seven OFDM symbols are arranged in one slot, where the CP length in the first OFDM symbol is 5.1 μs, and the CP length in second and subsequent OFDM symbols is 4.7 μs. On the other hand, with extended CPs, six OFDM symbols are arranged in one slot, and the CP length in each OFDM symbol is 16.7 μs, which is longer than those of normal CPs.

Extended CPs usually have a longer CP length than normal CPs. Consequently, even in the situation where the delay time is significant, the time a delayed signal from the immediately-preceding subframe overlaps is shorter than the CP length of extended CPs (for example, the length of time between the timings T4 and T5 in FIG. 2), the symbol interference from this delayed signal can be canceled.

On the other hand, extended CPs usually have a longer CP length than normal CPs, and therefore the amount of overhead increases. Consequently, if the time a delayed signal from the immediately-preceding subframe overlaps is shorter than the CP length of normal CPs, it is preferable to use normal CPs.

So, the present inventors have come up with the idea of applying CP lengths that suit various scenarios and requirements of inter-terminal discovery (D2D discovery), so that inter-symbol interference is canceled while tolerating amounts of overhead to match the scenarios and requirements, and thereupon arrived at the present invention.

The radio communication method according to the present invention is used in a communication system in which each user terminal transmits the discovery signal (inter-terminal discovery signal) in one or more DS transmission durations of a predetermined period. In the radio communication method according to the present invention, a radio base station determines the CP length configuration for use in DS transmission durations, and outputs CP length configuration information, which represents the CP length configuration that is determined. Each user terminal transmits the discovery signal based on the CP length configuration information.

(CP Length Configuration)

Now, the CP length configurations for use in the radio communication method according to the present invention will be described with reference to FIG. 4. The CP length configuration specifies the CP length in OFDM symbol subframes constituting the DS transmission duration. To be more specific, distinction is drawn between CP length configurations depending on whether the DS transmission duration is formed with normal CP subframes or with extended CP subframes.

Now, a normal CP subframe (first subframe) refers to a subframe that is formed with OFDM symbols in which normal CPs (first CPs) are inserted (see FIG. 3). Also, an extended CP (second subframe) refers to a subframe that is formed with OFDM symbols in which extended CPs (second CPs), which are longer than normal CPs, are inserted (see FIG. 3).

FIG. 4 provides diagrams to explain the CP length configuration for use in the radio communication method according to the present invention. As shown in FIG. 4A, in a CP length configuration 1 (the first CP length configuration), the DS transmission durations are formed by including multiple normal CP subframes (that is, by including a set of subframes). To be more specific, each DS transmission duration is formed with a plurality of normal CP subframes (for example, five normal CP subframes in FIG. 4A). In the CP length configuration 1, discovery signals to which normal CPs are attached are transmitted from user terminals. Normal CPs have a relatively short CP length, and are therefore suitable for short-distance (for example, indoor) inter-terminal discovery.

Also, as shown in FIG. 4B, in a CP length configuration 2 (second CP length configuration), the DS transmission durations are formed by including multiple extended CP subframes (that is, a set of subframes). To be more specific, in the CP length configuration 2, each DS transmission duration is formed with a plurality of extended CP subframes (for example, five extended CP subframes in FIG. 4B). In the CP length configuration 1, discovery signals to which extended CPs are attached are transmitted from user terminals. Extended CPs usually have a longer CP length than normal CPs, and are therefore suitable for inter-terminal discovery between different cells, long-distance inter-terminal discovery and so on.

Also, as shown in FIGS. 4C and 4D, in a CP length configuration 3 (third CP length configuration), the DS transmission durations are formed by including both normal CP subframes and extended CP subframes. The CP length configuration 3 may include a CP length configuration 3-1 (first configuration), in which, as shown in FIG. 4C, normal CP subframes and extended CP subframes are allocated to each DS transmission duration, and, a CP length configuration 3-2 (second configuration), in which, as shown in FIG. 4D, first DS transmission durations (first transmission durations) formed with normal CP subframes and second DS transmission durations (second transmission durations) formed with extended CP subframes are assigned.

As shown in FIG. 4C, in the CP length configuration 3-1, each DS transmission duration is formed with three normal CP subframes and two extended CP subframes. Note that the numbers of normal CP subframes and extended CP subframes included in each DS transmission duration are not limited to those illustrated in FIG. 4C.

Also, as shown in FIG. 4D, in the CP length configuration 3-2, first DS transmission durations and second DS transmission durations are provided alternately, but this is by no means limiting. For example, it is equally possible to provide first DS transmission durations and second DS transmission durations in the proportion of 1 to n or n to 1 (n≥2).

(CP Length Configuration Information)

Which of the CP length configurations shown in FIG. 4A to FIG. 4D is used is determined in the radio base station, and CP length configuration information to represent the determined CP length configuration is reported to user terminals. Now, the CP length configuration information for use in the radio communication method of the present invention will be described with reference to FIG. 5. FIG. 5 provides diagrams to show examples of CP length configuration information. As shown in FIG. 5, the CP length configuration information may be a pattern indicator (FIG. 5A), or may include a configuration type indicator and a size configuration indicator (FIG. 5B).

FIG. 5A is a diagram to explain pattern indicator used as CP length configuration information. A pattern indicator is an indicator to identify the allocation pattern of normal CP subframes and/or extended CP subframes in the CP length configurations 1, 2 and 3 (including 3-1 and 3-2).

As shown in FIG. 5A, the pattern indicators are formed with, for example, three bits. In FIG. 5A, "000" represents the CP length configuration 1 (FIG. 4A), "001" represents the CP length configuration 2 (FIG. 4B), and "010" to "111" represent the CP length configuration 3 (including the CP length configurations 3-1 and 3-2 of FIG. 4C and FIG. 4D). In the CP length configuration 3, a plurality of allocation patterns may be possible depending on the allocation of normal CP subframe and extended CP subframes. Consequently, to identify a plurality of allocation patterns of the CP length configuration 3, a plurality of values "010" to "111" are reserved.

FIG. 5B is a diagram to explain configuration type indicators and size indicators used as CP length configuration information. The configuration type indicators provide indicators to identify the CP length configurations 1, 2 and 3 (including 3-1 and 3-2). The size configuration indicators (allocation indicators) provide indicators to identify the allocation pattern (size) of normal CP subframes and extended CP subframes when the configuration type indicator represents the CP length configuration 3. The size configuration indicators (allocation indicators) may be referred to as "resource allocation information," "resource allocation indicators" and so on.

As shown in FIG. 5B, the configuration type indicators are formed with, for example, two bits. In FIG. 5B, "00" represents the CP length configuration 1 (FIG. 4A), "01" represents the CP length configuration 2 (FIG. 4B), "10" represents the CP length configuration 3-1 (FIG. 4C), and "11" represent the CP length configuration 3-2 (FIG. 4D).

Also, the size configuration indicators are formed with, for example, two bits. When the configuration type indicator represents the CP length configuration 3-1 ("10"), the size configuration indicator may be an indicator of the number of normal CP subframes or extended CP subframes included in each DS transmission duration. For example, in the event of FIG. 4C, the size configuration indicator identifies the combination of three normal CP subframes and two extended CP subframes.

Meanwhile, when the configuration type indicator represents the CP length configuration 3-2 ("11"), the size configuration indicator may be an indicator of the arrangement (period) of first DS transmission durations formed with normal CP subframes and second DS transmission durations formed with extended CP subframes. For example, in the event of FIG. 4D, the size configuration indicator identifies that first DS transmission durations and second DS transmission durations are provided alternately.

Note that the size configuration indicator may be provided or made valid only when the configuration type indicator represents the CP length configuration 3 (when the top bit is "1"). This is because, in the event of the CP length configurations 1 and 2, it is not necessary to identify the allocation pattern of normal CP subframes and extended CP subframes.

(Radio Communication Method)

Now, the operation of the radio communication method of the present invention to use the above CP length configuration and CP length configuration information will be described in detail with reference to FIG. 6. Note that the radio communication method according to the present invention is applicable even when a plurality of user terminals form a cluster. When a cluster is formed, a specific user terminal (cluster head), instead of a radio base station, may control the other user terminals. A radio communication system to include a radio base station and user terminals will be described below as an example.

Figure 6B:
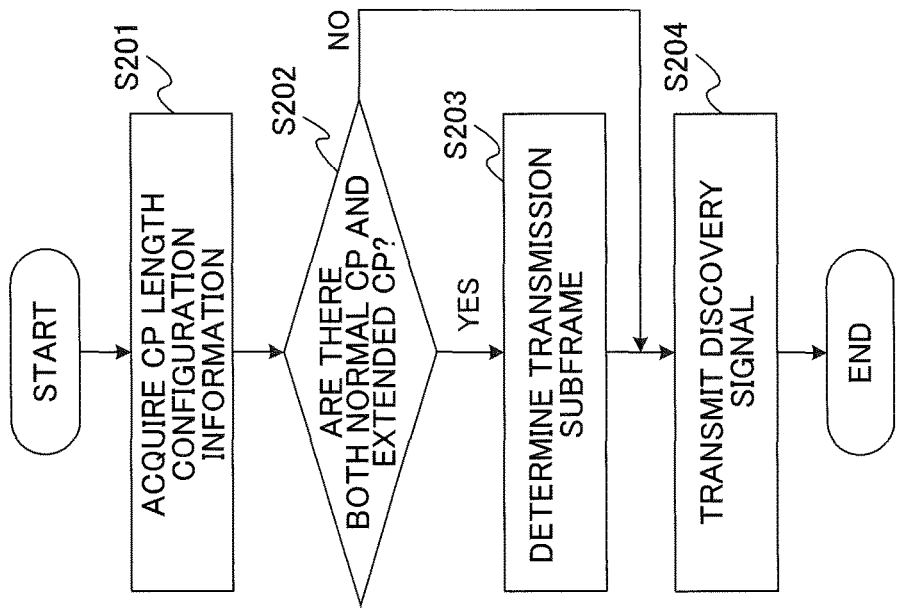
FIG. 6 provides diagrams to explain the operation of the radio communication method according to the present invention in detail.
Figure 6A:
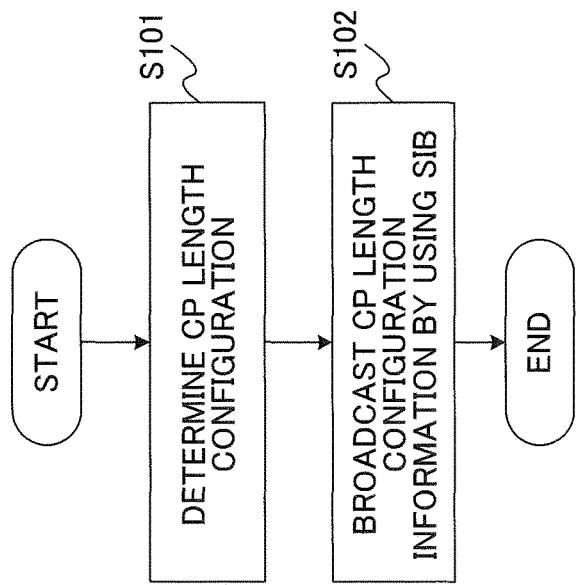

FIG. 6 provides diagrams to explain the radio communication method according to the present invention. The operation of a radio base station in the radio communication method of the present invention will be described with reference to FIG. 6A. Note that, when the above-noted cluster is formed, this radio base station's operation may be executed by a specific user terminal (cluster head).

As shown in FIG. 6A, the radio base station determines the CP length configuration based on at least one of measurement reports, timing offset information and location information from the user terminals (step S101).

Here, a measurement report includes the received quality of signals from other user terminals in DS transmission durations, the received power (received intensity), the discovery signal detection success rate (failure rate), and so on. Also, a measurement report includes the received quality or the received power (received intensity) of reference signals from the radio base station (for example, the CRS (Cell-specific Reference Signal), the CSI-RS (Channel State Information-Reference Signal), etc.) and so on. Also, the timing offset information is information that represents the timing offset (timing gap) between the start timing of each subframe in DS transmission durations and the arrival timing of discovery signals from other user terminals. Also, the location information is information that represents the locations of user terminals, and may be, for example, GPS (Global Positioning System)-based measurement locations.

To be more specific, the radio base station may determine the CP length configuration based on the received quality or the received power (received intensity) included in measurement reports. For example, the radio base station may determine on the CP length configuration 1 (FIG. 4A), which uses normal CPs, if the received quality or the received power (received intensity) is better than a predetermined threshold. Also, the radio base station may determine on the CP length configuration 2 (FIG. 4B), which uses extended CPs, if the received quality or the received power (received intensity) is poorer than the predetermined threshold. Also, if there are both user terminals showing better received quality or received power (received intensity) than the predetermined threshold and user terminals showing poorer received quality or received power (received intensity) than the predetermined threshold, the radio base station may determine on the CP length configuration 3 (FIGS. 4C and 4D), which uses both normal CPs and extended CPs. Note that, as mentioned earlier, the received quality or the received power (received intensity) here may be the received quality or the received power (received intensity) of discovery signals from other user terminals, or may be the received quality or the received power (received intensity) of reference signals from the radio base station.

Also, the radio base station may determine the CP length configuration based on the detection success rate (or failure rate) of discovery signals. For example, if the detection success rate is higher than a predetermined threshold, the radio base station may determine on the CP length configuration 1, which uses normal CPs (FIG. 4A). Also, if the detection success rate is lower than the predetermined threshold, the radio base station may determine on the CP length configuration 2, which uses extended CPs (FIG. 4B). Also, if there are both user terminals having a detection success rate higher than the predetermined threshold and user terminals having a detection success rate lower than the predetermined threshold, the radio base station may determine on the CP length configuration 3, which uses both normal CPs and extended CPs (FIGS. 4C and 4D).

Also, the radio base station may determine the CP length configuration based on the timing offset information. For example, if the timing offset is shorter than normal CPs, the radio base station may determine on the CP length configuration 1, which uses normal CPs (FIG. 4A). Also, if the timing offset is longer than normal CPs, the radio base station may determine on the CP length configuration 2, which uses extended CPs (FIG. 4B). Also, if there are user terminals where the timing offset is shorter than normal CPs and user terminals where the timing offset is longer than normal CPs, the radio base station may determine on the CP length configuration 3, which uses both normal CPs and extended CPs (FIGS. 4C and 4D).

Also, the radio base station may determine the CP length configuration based on the distance between user terminals, which is calculated based on the location information. For example, if the distance between user terminals is less than a predetermined threshold, the radio base station may determine on the CP length configuration 1, which uses normal CPs (FIG. 4A). Also, if the distance between user terminals is greater than the predetermined threshold, the radio base station may determine on the CP length configuration 2, which uses extended CPs (FIG. 4B). Also, if there are both user terminals where the distance with respect to a given user terminal is less than a predetermined threshold and user terminals user terminals where the distance with respect to a given user terminal is less than the predetermined threshold, the radio base station may determine on the CP length configuration 3, which uses both normal CPs and extended CPs (FIGS. 4C and 4D).

The radio base station broadcasts CP length configuration information, which represents the CP length configuration determined in the above-described manner, by using the SIB (System Information Block) (step S102). Note that the CP length configuration information may be reported by using RRC signaling, the PBCH and so on. Also, as mentioned earlier, the CP length configuration information may be a pattern indicator (FIG. 5A), or may include a configuration type indicator and a size configuration indicator (allocation indicator) (FIG. 5B).

Next, the operation of user terminals in the radio communication method according to the present invention will be described with reference to FIG. 6B. Note that, in FIG. 6B, a user terminal receives information to represent DS transmission durations (for example, subframe offset, the period of these DS transmission durations, the number of subframes in these DS transmission durations, and so on), and, based on this information, specifies DS transmission durations.

As shown in FIG. 6B, the user terminal receives (acquires) the CP length configuration information that is broadcast from the radio base station by using the SIB (step S201).

The user terminal decides whether or not the CP length configuration information from the radio base station represents the CP length configuration 3, which uses both normal CPs and extended CPs (step S202). For example, if the CP length configuration information is a pattern indicator (FIG. 5A), the user terminal may decide whether the pattern indicator is one of "010" to "111." Also, if the CP length configuration information contains a configuration type indicator and a size configuration indicator (allocation indicator), the user terminal may decide whether the first bit of the configuration type indicator is "1."

If the CP length configuration information does not represent the CP length configuration 3 (but represents the CP length configuration 1 or 2), the operation moves on to step S204. On the other hand, if the CP length configuration information represents the CP length configuration 3, the user terminal determines in which of normal CP subframes and extended CP subframes the discovery signal will be transmitted, in accordance with the subject terminal's requirements (step S203). Note that the requirements may include, for example, whether or not to allow user terminals that are located farther away, to discover the subject terminal.

The user terminal transmits the discovery signal based on the result determined as to the use of normal CP subframes and extended CP subframes (step S204).

Also, the user terminal may transmit the discovery signal with transmission power that is determined based on the CP length configuration information from the radio base station. To be more specific, the user terminal may use relatively low transmission power when transmitting the discovery signal in normal CP subframes. Also, when transmitting the discovery signal in extended CP subframes, the user terminal may use greater transmission power than in normal CP subframes.

With the radio communication method according to the present invention, the radio base station determines the CP length configuration and transmits CP length configuration information representing this CP length configuration, and each user terminal transmits the discovery signal based on this CP length configuration information. Consequently, even when the discovery signals are delayed due to propagation delays, timing errors and so on, it is possible to reduce the impact of inter-symbol interference due to such delays. To be more specific, if the time a delayed signal from the immediately-preceding subframe overlaps (for example, the length of time between the timings T4 and T5 in FIG. 2) is shorter than the CP length in the CP length configuration that is determined, it is possible to cancel the symbol interference due to this delayed signal.

(Radio Communication System)

Now, an example of a radio communication system according to the present embodiment will be described in detail below. In this radio communication system, the above-described radio communication method is employed. Note that the radio communication system according to the present embodiment may be a radio communication system which includes a radio base station and user terminals, or may be a radio communication system which does not include a radio base station but in which a plurality of user terminals form a cluster. Now, a radio communication system to include a radio base station and user terminals will be described below as an example.

Figure 7:
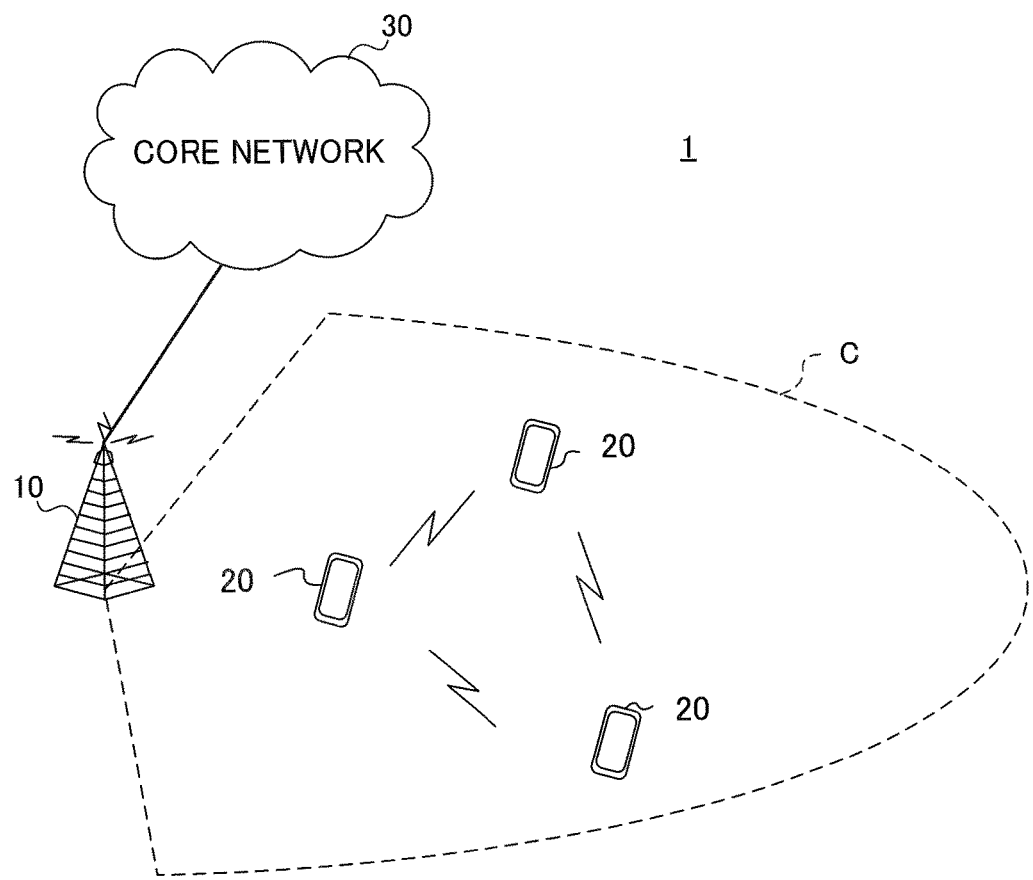
FIG. 7 is a schematic diagram to show an example of a radio communication system according to the present embodiment.

FIG. 7 is a diagram to show a schematic structure of the radio communication system according to the present embodiment. As shown in FIG. 7, the radio communication system 1 is formed by including a radio base station 10 that forms a cell C, user terminals 20, and a core network 30 to which the radio base station 10 is connected. Note that the numbers of radio base stations 10 and user terminals 20 are not limited to those illustrated in FIG. 7.

The radio base station 10 is a radio base station to have a predetermined coverage. Note that the radio base station 10 may be a macro base station having a relatively wide coverage (eNodeB, macro base station, aggregation node, transmission point, transmitting/receiving point), or may be a small base station having a local coverage (small base station, pico base station, femto base station, HeNB (Home eNodeB), RRH (Remote Radio Head), micro base station, transmission point, transmitting/receiving point).

The user terminals 20 are terminals to support various communication schemes such as LTE and LTE-A, and may not only cover mobile communication terminals, but may also cover stationary communication terminals as well. The user terminals 20 carry out downlink/uplink communication with the radio base station 10, and carry out inter-terminal (D2D) communication/detection with other user terminals 20.

Also, in the radio communication system 1, a downlink shared channel (PDSCH: Physical Downlink Shared Channel), which is used by each user terminal 20 on a shared basis, downlink control channels (PDCCH (Physical Downlink Control Channel) and EPDCCH (Enhanced Physical Downlink Control Channel)), a broadcast channel (PBCH) and so on are used as downlink channels. User data, higher layer control information and a predetermined SIB (System Information Block) are communicated by the PDSCH. Downlink control information (DCI) is communicated by the PDCCH and the EPDCCH.

Also, in the radio communication system 1, as uplink channels, an uplink shared channel (PUSCH: Physical Uplink Shared Channel) that is used by each user terminal 20 on a shared basis, an uplink control channel (PUCCH: Physical Uplink Control Channel) and so on are used. User data and higher layer control information are transmitted by the PUSCH. In the radio communication system 1, discovery signals (inter-terminal discovery signals) for allowing the user terminals 20 to detect each other are transmitted on the uplink.

Figure 8:
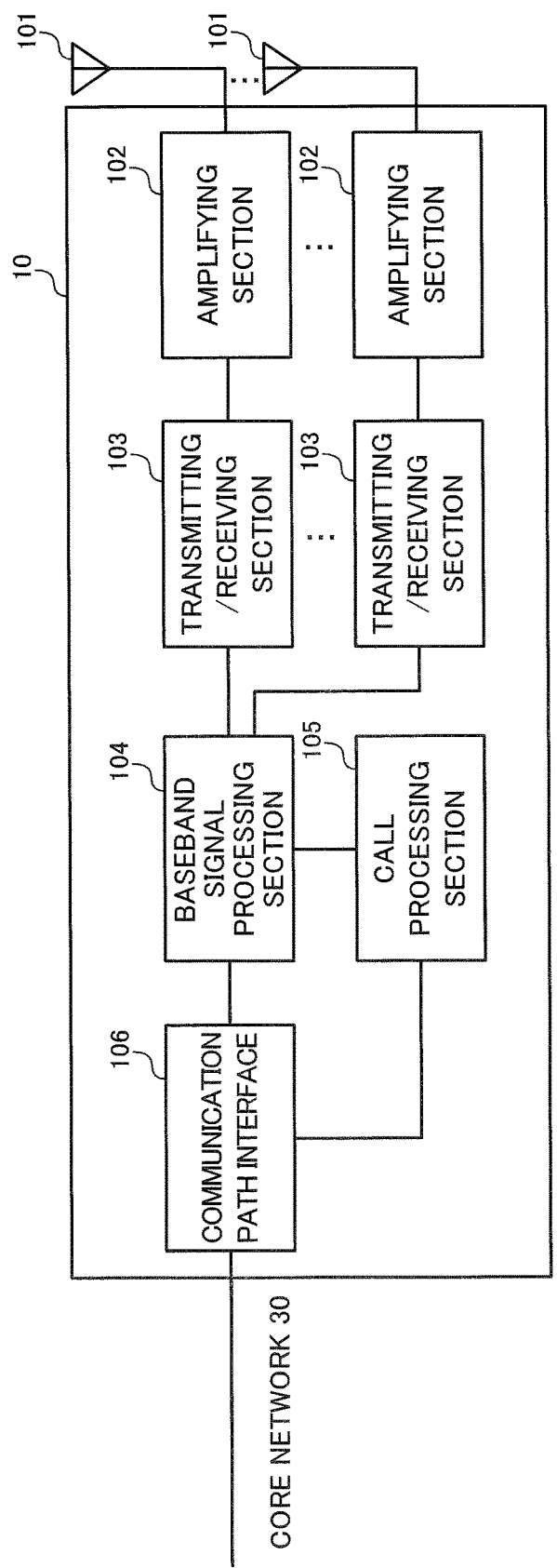
FIG. 8 is a diagram to show an overall structure of a radio base station according to the present embodiment.

Now, overall structures of the radio base station 10 and the user terminal 20 will be described with reference to FIGS. 8 and 9. FIG. 8 is a diagram to show an overall structure of a radio base station 10 according to the present embodiment. AS shown in FIG. 8, the radio base station 10 has a plurality of transmitting/receiving antennas 101 for MIMO communication, amplifying sections 102, transmitting/receiving sections 103 (transmitting section and receiving section), a baseband signal processing section 104, a call processing section 105 and a communication path interface 106.

User data to be transmitted from the radio base station 10 to a user terminal 20 on the downlink is input from the core network 30, into the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, a pre-coding process, a CP insertion process and so on are performed, and the result is forwarded to each transmitting/receiving section 103. Furthermore, downlink control signals (including reference signals, synchronization signals, broadcast signal, etc.) are also subjected to transmission processes such as channel coding and an inverse fast Fourier transform, and are forwarded to each transmitting/receiving section 103.

Each transmitting/receiving section 103 converts the downlink signals, which are pre-coded and output from the baseband signal processing section 104 on a per antenna basis, into a radio frequency. The amplifying sections 102 amplify the radio frequency signals having been subjected to frequency conversion, and transmit the signals through the transmitting/receiving antennas 101.

The amplifying sections 102 amplify the radio frequency signals having been subjected to frequency conversion, and transmit the signals through the transmitting/receiving antennas 101.

In the baseband signal processing section 104, the user data that is included in the input uplink signals is subjected to a CP removal process, an FFT process, an IDFT process, error correction decoding, a MAC re transmission control receiving process and RLC layer and PDCP layer receiving processes, and the result is forwarded to the core network 30 via the communication path interface 106. The call processing section 105 performs call processing such as setting up and releasing communication channels, manages the state of the radio base station 10 and manages the radio resources.

Figure 9:
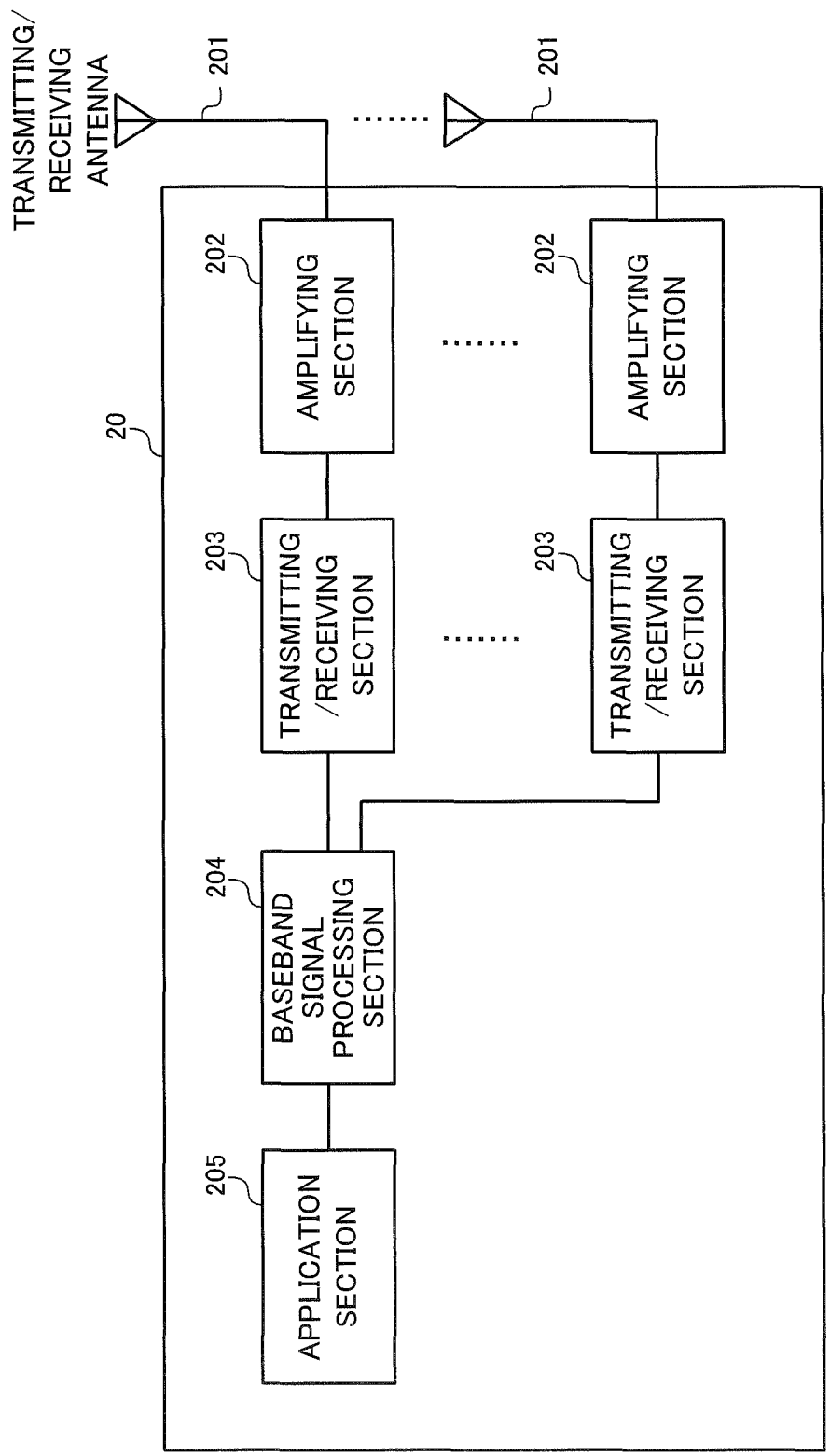
FIG. 9 is a diagram to explain an overall structure of a user terminal according to the present embodiment.

FIG. 9 is a diagram to show an overall structure of a user terminal 20 according to the present embodiment. The user terminal 20 has a plurality of transmitting/receiving antennas 201 for MIMO communication, amplifying sections 202, transmitting/receiving sections 203 (receiving section and transmitting section), a baseband signal processing section 204 and an application section 205. Note that the user terminal 20 may switch the receiving frequency by means of one receiving circuit (RF circuit), or may have a plurality of receiving circuits.

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, a CP removal process, an FFT process, error correction decoding, a retransmission control receiving process and so on are performed. The user data that is included in the downlink signals is forwarded to the application section 205. The application section 205 performs processes related to higher layers above the physical layer and the MAC layer. Furthermore, the broadcast information in the downlink data is also forwarded to the application section 205.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process, a CP insertion process and so on, and the result is forwarded to each transmitting/receiving section 203. The baseband signal that is output from the baseband signal processing section 204 is converted into a radio frequency in the transmitting/receiving sections 203. After that, the amplifying sections 202 amplify the radio frequency signal having been subjected to frequency conversion, and transmit the result from the transmitting/receiving antennas 201.

Figure 10:
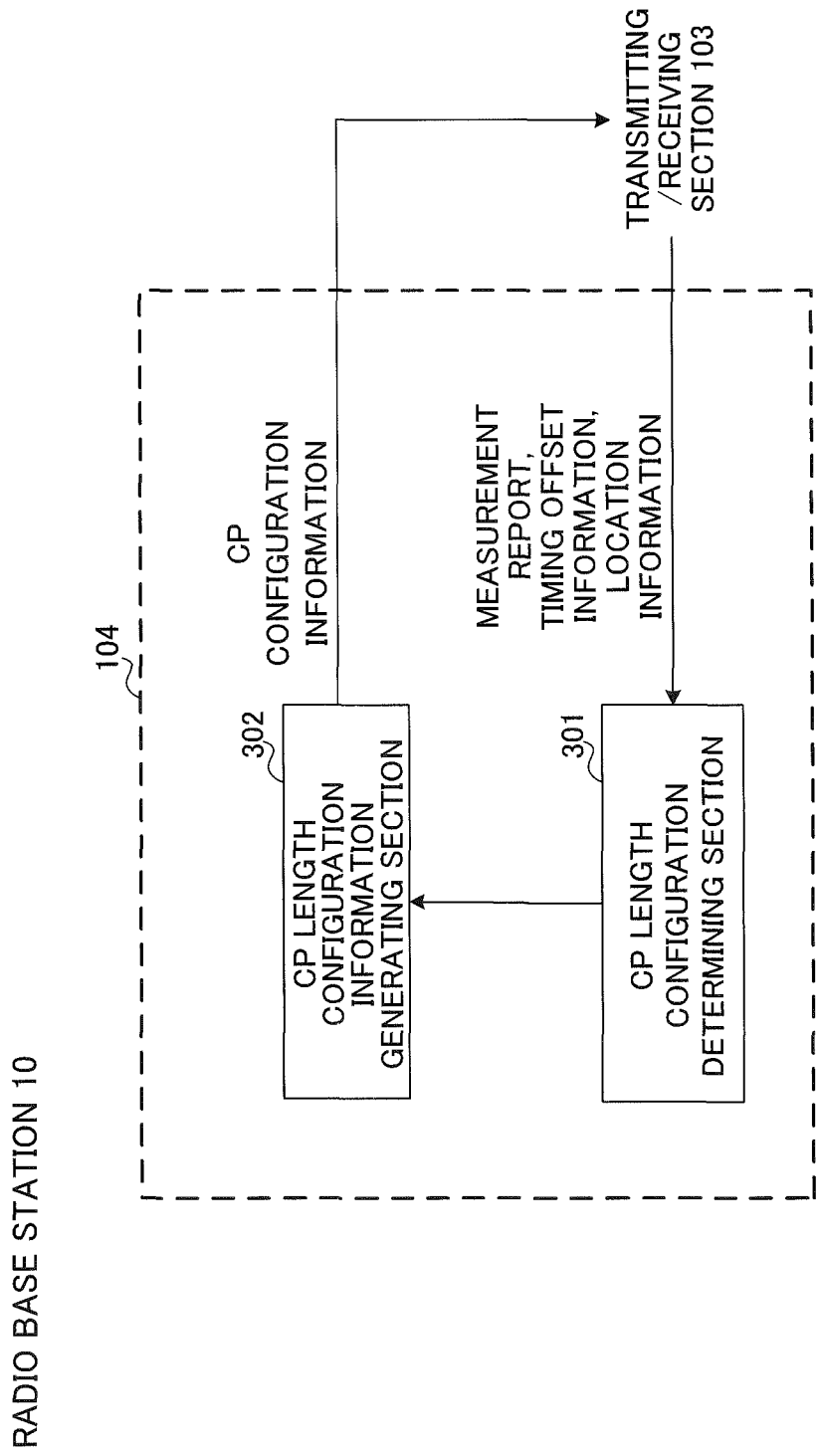
FIG. 10 is a diagram to show a functional structure of a radio base station according to the present embodiment.
Figure 11:
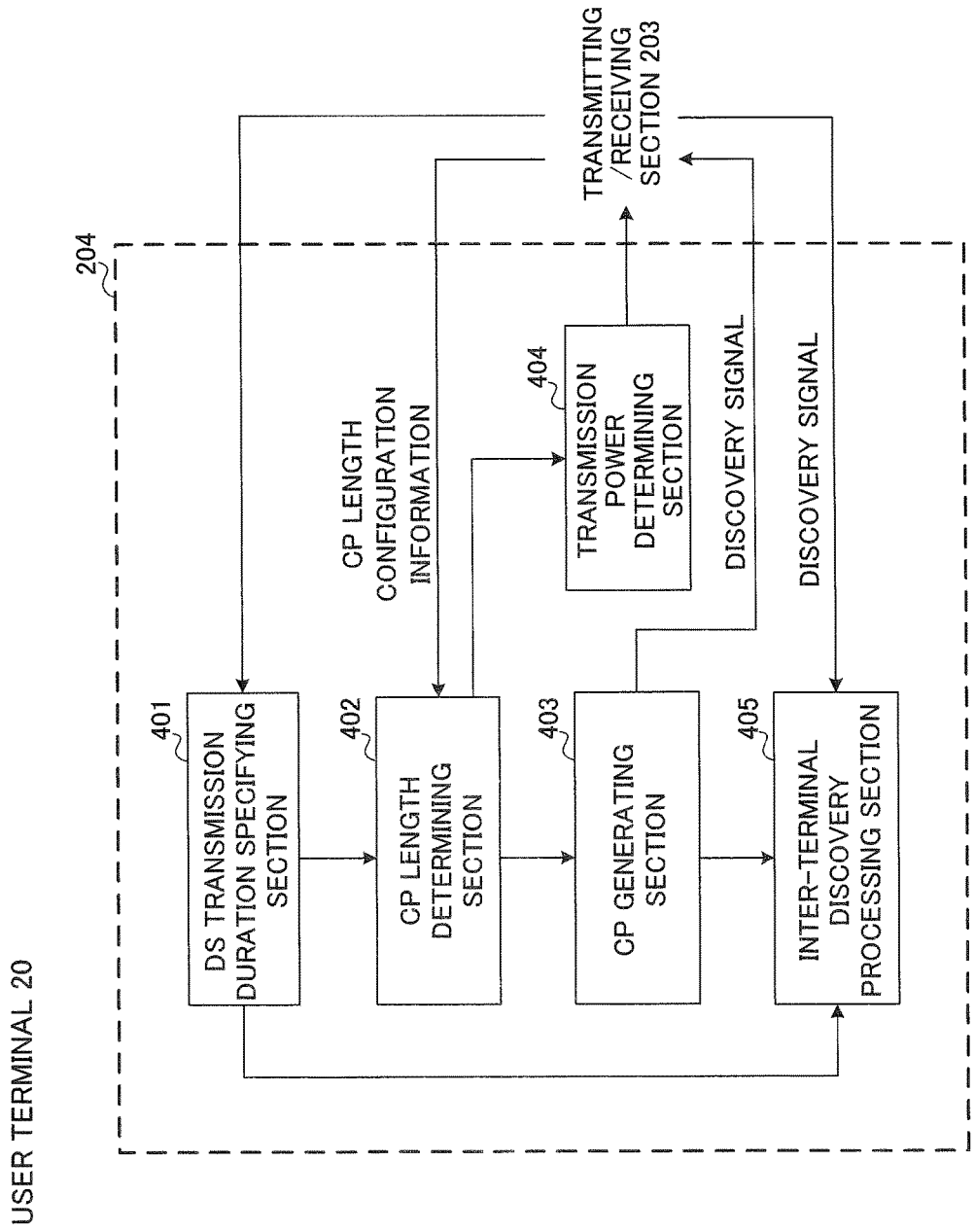
FIG. 11 is a diagram to show a functional structure of a user terminal according to the present embodiment.

Next, functional structures of the radio base station 10 and user terminal 20 will be described with reference to FIGS. 10 and 11. The functional structure of the radio base station 10 shown in FIG. 10 is primarily formed with the baseband signal processing section 104 of FIG. 8. Also, the functional structure of the user terminal 20 shown in FIG. 11 is primarily formed with the baseband signal processing section 204 of FIG. 9.

FIG. 10 is a diagram to show a functional structure of the radio base station 10 according to the present embodiment. Note that, when a plurality of user terminals 20 form a cluster, the following functional structure of the radio base station 10 may be provided in a specific user terminal 20 (cluster head). As shown in FIG. 10, the radio base station 10 has a CP length configuration determining section (determining section) 301 and a CP length configuration information generating section 302.

The CP length configuration determining section 301 determines the CP length configuration for use in DS transmission durations. To be more specific, the CP length configuration determining section 301 determines on one of the CP length configuration 1 (first CP length configuration), in which, as shown in FIG. 4A, the DS transmission durations are formed by including a plurality of normal CP subframes (first subframes), the CP length configuration 2 (second CP length configuration), in which, as shown in FIG. 4B, the DS transmission durations are formed by including a plurality of extended CP subframes (second subframes), and the CP length configuration 3 (third CP length configuration), in which the DS transmission durations are formed by including both normal CP subframes and extended CP subframes, as the CP length configuration.

Note that the CP length configuration 3 may include the CP length configuration 3-1 (first configuration), in which, as shown in FIG. 4C, normal CP subframes and extended CP subframes are allocated in each transmission duration, and the CP length configuration 3-2 (second configuration), in which, as shown in FIG. 4D, first DS transmission durations (first transmission durations) formed with normal CP subframes, and second DS transmission durations (second transmission durations) formed with extended CP subframes, are allocated.

Also, the CP length configuration determining section 301 may determine the CP length configuration based on at least one of measurement reports, timing offset information and location information from the user terminals 20. Note that the details of the determination of the CP length configuration using at least one of measurement reports, timing offset information and location information has been described earlier with reference to step S101 of FIG. 6.

The CP length configuration information generating section 302 generates CP length configuration information, which represents the CP length configuration determined in the above-described manner. As mentioned earlier, the CP length configuration information may be a pattern indicator (FIG. 5A), or may include a configuration type indicator and a size configuration indicator (allocation indicator) (FIG. 5B). The CP length configuration information that is generated may be broadcast from the transmitting/receiving sections 103 by using the SIB. Alternatively, the CP length configuration information may be reported from the transmitting/receiving sections 103 to the user terminals 20 by using RRC signaling, the PBCH and so on.

FIG. 11 is a diagram to show a functional structure of a user terminal 20 according to the present embodiment. As shown in FIG. 11, the user terminal 20 has a DS transmission duration specifying section 401, a CP length determining section (determining section) 402, a discovery signal (DS) generating section 403, a transmission power determining section 404 and an inter-terminal discovery processing section 405.

The DS transmission duration specifying section 401 specifies DS transmission durations based on information to represent DS transmission durations from the radio base station 10 (for example, subframe offset, the period of these DS transmission durations, the number of subframes in these DS transmission durations and so on). As mentioned earlier, this information may be reported from the radio base station 10 to the user terminal 20 by using, for example, the SIB, RRC signaling, a broadcast channel and so on.

The CP length determining section 402 determines the CP length to use to transmit the discovery signal, based on the CP length configuration information from the radio base station 10, and outputs the determined result to the DS generating section 403 and the transmission power determining section 404. As noted earlier, this CP length configuration information may be reported from the radio base station 10 to the user terminal 20 by using, for example, the SIB, RRC signaling, a broadcast channel and so on.

To be more specific, the CP length determining section 402 decides whether or not the CP length configuration information represents the CP length configuration 3, which uses both normal CPs and extended CPs. For example, if the CP length configuration information is a pattern indicator (FIG. 5A), the CP length configuration determining section 402 may decide whether the pattern indicator is one of "010" to "111." Also, if the CP length configuration information contains a configuration type indicator and a size configuration indicator (allocation indicator), the CP length configuration determining section 402 may decide whether the first bit of the configuration type indicator is "1."

When the CP length configuration information represents the CP length configuration 1, the CP length determining section 402 determines transmitting the discovery signal using normal CPs (in normal CP subframes). On the other hand, when the CP length configuration information represents the CP length configuration, the CP length determining section 402 determines transmitting the discovery signal using extended CPs (in extended CP subframes).

Also, if the CP length configuration information represents the CP length configuration 3, the CP length determining section 402 determines by using which of normal CPs and extended CPs (in which of normal CP subframes and extended CP subframes) the discovery signal will be transmitted, in accordance with the subject terminal's requirements. Note that the requirements may include, for example, whether or not to allow user terminals that are located farther away, to discover the subject terminal.

The DS generating section 403 generates the discovery signal based on the result determined in the CP length determining section 402. To be more specific, the DS generating section 403 generates the discovery signal by using one of normal CPs or extended CPs, in accordance with the result determined in the CP length determining section 402.

The transmission power determining section 404 determines the transmission power of the discovery signal based on the result determined in the CP length determining section 402. To be more specific, when normal CPs are used, the transmission power determining section 404 determines transmitting the discovery signal with relatively low transmission power. On the other hand, when extended CPs are used, the transmission power determining section 404 determines transmitting the discovery signal with relatively high transmission power.

The Inter-terminal discovery processing section 405 performs an inter-terminal discovery process. To be more specific, in DS transmission durations specified by the DS transmission duration specifying section 401, the inter-terminal discovery processing section 405 detects the discovery signals from other user terminals 20 and discovers other user terminals 20 based on these discovery signals.

With the radio communication system 1 according to the present invention, the radio base station determines the CP length configuration and transmits CP length configuration information representing this CP length configuration, and each user terminal transmits the discovery signal based on this CP length configuration information. Consequently, even when the discovery signals are delayed due to propagation delays, timing errors and so on, it is possible to reduce the impact of inter-symbol interference due to such delays. To be more specific, if the time a delayed signal from the immediately-preceding subframe overlaps (for example, the length of time between the timings T4 and T5 in FIG. 2) is shorter than the CP length in the CP length configuration that is determined, it is possible to cancel the symbol interference due to this delayed signal.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention. That is to say, the description herein is provided only for the purpose of explaining examples, and should by no means be construed to limit the present invention in any way.

The disclosure of Japanese Patent Application No. 2013-226439, filed on Oct. 31, 2013, including the specification, drawings and abstract, is incorporated herein by reference in its entirety.

The invention claimed is:

1. A user terminal comprising:
 a transmitter that transmits a discovery signal for Device to Device (D2D) communication in a transmission duration of a predetermined period;
 a receiver that receives cyclic prefix (CP) length configuration information which represents a CP length for use in transmission of the discovery signal; and
 a processor that determines both of the transmission duration and transmission power based on the CP length configuration information,
 wherein the transmitter transmits the discovery signal in the determined transmission duration with the determined transmission power.

2. The user terminal according to claim 1, wherein the CP length is a first CP and/or a second CP that is longer than the first CP.

3. The user terminal according to claim 1, wherein
the receiver receives information indicating the transmission duration, and
the transmission duration is configured based on the received information.

4. The user terminal according to claim 3, wherein the information indicating the transmission duration includes at least one of a subframe offset and the period of the transmission duration.

5. The user terminal according to claim 2, wherein
the receiver receives information indicating the transmission duration, and
the transmission duration is configured based on the received information.

6. A radio base station used in a radio communication system in which a discovery signal for Device to Device (D2D) communication is transmitted and/or received between user terminals in a transmission duration of a predetermined period, the radio base station comprising:
a processor that determines a cyclic prefix (CP) length for use in transmission of the discovery signal; and
a transmitter that transmits CP length configuration information that represents the CP length,
wherein the user terminals determine both of the transmission duration and transmission power based on the CP length configuration information, and
wherein the user terminals transmit the discovery signal in the determined transmission duration with the determined transmission power.

7. The radio base station according to claim 6, wherein the CP length is a first CP and/or a second CP that is longer than the first CP.

8. The radio base station according to claim 6, wherein the transmitter transmits information indicating the transmission duration.

9. The radio base station according to claim 8, wherein the information indicating the transmission duration includes at least one of a subframe offset and the period of the transmission duration.

10. The radio base station according to claim 7, wherein the transmitter transmits information indicating the transmission duration.

11. A radio communication method comprising:
in a user terminal, transmitting a discovery signal for Device to Device (D2D) communication in a transmission duration of a predetermined period;
in the user terminal, receiving cyclic prefix (CP) length configuration information which represents a CP length for use in transmission of the discovery signal; and
in the user terminal, determining both of the transmission duration and transmission power based on the CP length configuration information,
wherein the user terminal transmits the discovery signal in the determined transmission duration with the determined transmission power.

* * * * *